Patented Feb. 24, 1948

2,436,420

UNITED STATES PATENT OFFICE 2,436,420

METHOD OF COATING FERROUS METAL ARTICLES WITH CORROSION-RESISTANT PLASTIC

Erith T. Clayton, Baltimore, Md.

No Drawing. Application December 29, 1943, Serial No. 516,088

1 Claim. (Cl. 117—75)

This invention relates to corrosion-resisting composite structures and to methods of making the same, and particularly to the production of steel, iron, or other metal articles having bonded or laminated thereto a corrosion-resisting plastic which renders the structures resistant to strong acids and other highly corrosive media.

Acid containers, reaction vessels, and tank cars for transporting acids are examples of many articles used in the chemical, transport and other industries which require very expensive materials or methods for their construction, if quick destruction by the corrosive media to which they are subjected is to be avoided. Such articles either are made of expensive alloys, lead, or hard plastics or rubber; or they are lined with rubber, synthetic rubber, glass or baked-on plastics, where corrodible metals such as iron or steel are used as the base material. The structure is costly in any case; and in many instances steel or the like is used under strongly corrosive conditions, despite the difficulties this entails, for the lack of any inexpensive and practicable way to make the structure corrosion-resistant.

Plastics produced from resin-forming vegetable extracts, such as cashew nut shell oil, are known to possess extraordinary properties of corrosion resistance, especially against the effects of strong acids. They do not require heat or pressure for polymerization, but polymerize at ordinary temperatures when treated with paraformaldehyde or the like. These plastics, however, have not been useful to make steel reagent containers and similar metal articles which resist corrosion, because no effective way has been known for bonding them to the metal. A layer applied to steel will not adhere and easily strips away from the metal surface. It has been proposed to secure adherence to metal by applying the plastic in admixture with special resins and drying oil and heating the applied coatings, but this entails complications and cannot be practiced effectively in the field, nor for many fabricated articles.

An object of my invention is to provide new and improved corrosion-resisting articles or structures and a method of making the same which utilize plastics produced from resin-forming vegetable extracts to cover and protect the surfaces of base materials, such as steel and other metals, to which such plastics will not themselves adhere.

Another object is to reduce the cost and extend the fields of use of corrosion-resisting structures which employ a metal base material for strength and a bonded layer of polymerized plastic for acid resistance.

Another object of my invention is to provide a practicable method for bonding such plastics to metal under ordinary temperature and pressure conditions, so that articles in use, such as steel acid tanks, reaction vessels, etc., can be converted in the field into structures highly resistant to acids and other corrosive media.

Other objects, features and advantages of my invention will become apparent from the following description, and the invention will be defined in the appended claim.

I have discovered that corrosion-resisting plastics such as those formed by the polymerization of resin-forming vegetable extracts can be bonded strongly to steel or other metal surfaces by first applying to the metal a sublayer consisting of one or more coatings containing a metallic pigment, such as finely divided zinc, and thereafter applying a resinifying substance, such as a mixture of cashew nut shell oil and paraformaldehyde, which polymerizes at atmospheric temperatures so as to form an integral, non-corrodible plastic layer bonded to the metal surface through the intervening sublayer. More than one coating of such substance may be applied, if desired, to perfect the corrosion resisting layer.

The composite structure produced pursuant hereto has the protective plastic layer so strongly bonded to the metal that it is difficult if not impossible to separate them. The structure thus can be used where it is subjected to considerable physical strains, and it withstands without damage the strains which result from dimensional changes in the metal base material caused by bending or other deformation or by temperature changes.

The coat or coatings in the sublayer may be made by applying to the metal surface any of various known zinc dust paints. For the best results, however, this paint or subcoating composition should comprise zinc pigment incorporated in a vehicle which contains a resinous substance that polymerizes at ordinary temperatures, such as an alkyd resin or cashew nut shell oil. Interfacial reactions occur between the sublayer and the plastic-forming layer which give extraordinary tenacity to the bond between the acid-resisting plastic and the metal base material—e. g., the zinc in the sublayer exhibits reducing and other powers which affect the polymerization and the adhesion of the plastic layer; and the resinous substance contained in the sublayer probably unites with the superimposed plastic through chemical reaction with the aldehyde polymerizing agent applied with the plastic.

It appears also that the zinc particles in the sublayer impart a surface roughness and porosity thereto which contribute to the strength of the bond, and to enhance this effect I have found it advantageous to apply one or more coats of zinc paint in making the sublayer, and to use for at least the topmost of these a paint which contains blown zinc dust substantially free from oxide and appreciably larger or coarser than the zinc contained in usual zinc dust paints. The latter if desired may be used to make the coat or coats first applied.

It is to be observed that the acid-resisting plastic layer bonded to a metal base or the like as herein disclosed may have its own top surface coated or treated in various ways to modify further the physical characteristics and usefulness of the completed structure, and I regard such practices in general as being within the scope of my invention.

As an example of actual practice pursuant hereto, a container made of sheet steel was treated as follows: The inside walls, in a suitably clean condition, were first coated with a zinc paint such as "bright zinc flake," which was applied by a brush and left about 5 hours to dry. This paint contained alkyd resin ("Glyptal" alkyd No. 2458, an air-drying oil-modified polyhydric alcohol-polycarboxylic acid resin, a product of General Electric Co.) as the main ingredient of the vehicle, together with about 10 lbs. per gallon of zinc pigment averaging about 300-mesh in particle size. A second coat of similar paint was next applied and allowed to dry for about 5 hours. A third coat of similar paint was then applied, which contained zinc dust averaging about 200-mesh in particle size. After this third coat had dried about 5 hours, a cashew nut shell oil material (known as "light-viscosity Harvel 816") was mixed with paraformaldehyde to a consistency enabling it to be applied with a trowel, and a layer of this mixture was then applied over the pigmented sublayer on the metal container. After about an hour this plastic layer had polymerized and it became quite dry and hard after standing about 5 to 10 days. The plastic layer was extended over the edges of the metal to insure against interlaminar corrosion.

The structure thus produced was used for several months for the storage and transportation of strong reagents, including boiling 50% (by volume) sulfuric acid, hot acetic acid and concentrated sulfuric acid. None of these caused any observable deterioration. The plastic layer was so strongly bonded to the metal, both before and after such use, that they could not be separated.

A similar structure was subjected to thermal shocks by testing it repeatedly with boiling reagents and rinsing with cold water after each test, but the resulting dimensional changes did not affect the strength of the bond.

According to the method herein disclosed, new composite structures can be produced by simple manual operations under atmospheric temperature and pressure conditions. The method thus lends itself to use by comparatively unskilled workmen, and it can be used anywhere, without the need of special equipment such as is required for heating, baking and other critical operations, to impart corrosion resistance to fabricated metal articles of many types. If desired, however, the final drying of the protective plastic layer may be hastened by applying heat. Metal cooling towers, scrubbers, chimneys, tank cars for acids, reagent storage tanks, reaction vessels, etc., are but a few of many valuable applications of my invention.

The foregoing specification is presented to illustrate my invention, which is intended to be defined by the appended claim and should be accorded a scope commensurate with its contribution to the art.

I claim:

A method for cladding ferrous metal surfaces under atmospheric pressure and temperature conditions so as to render the same corrosion proof and capable of withstanding without damage strains resulting from dimensional changes in the metal caused by bending or other deformations including coating a ferrous metal base with a layer comprising coarse zinc dust substantially free from oxides, the particles size averaging about 200 mesh, said dust being incorporated in an air-drying oil-modified polyhydric alcohol-polycarboxylic acid resin to form an intermediate penetrable bonding layer having a roughened surface, then applying a coating of a cashew nut shell liquid-paraformaldehyde reaction product that is polymerizable at atmospheric temperatures, which coating penetrates the first applied intermediate bonding layer, and drying the composite coating to polymerize both the first coacting and the final coat on the base.

ERITH T. CLAYTON.

REFERENCES CITED

The following references are of record in the file of this patent:

UNITED STATES PATENTS

| Number | Name | Date |
|---|---|---|
| 1,171,725 | Jones | Feb. 15, 1916 |
| 1,268,987 | McMullen | June 11, 1918 |
| 1,921,293 | Harvey | Aug. 8, 1933 |
| 2,056,399 | Hochwalt | Oct. 6, 1936 |
| 2,317,116 | Sheridan | Apr. 20, 1943 |

Certificate of Correction

Patent No. 2,436,420.  February 24, 1948.

ERITH T. CLAYTON

It is hereby certified that error appears in the printed specification of the above numbered patent requiring correction as follows: Column 4, line 46, for the word "coacting" read *coating*; and that the said Letters Patent should be read with this correction therein that the same may conform to the record of the case in the Patent Office.

Signed and sealed this 27th day of April, A. D. 1948.

[SEAL]

THOMAS F. MURPHY,
*Assistant Commissioner of Patents.*